United States Patent [19]

Kenworthy et al.

[11] 4,154,651
[45] May 15, 1979

[54] LIQUID METAL COOLED FAST BREEDER NUCLEAR REACTORS

[75] Inventors: Gordon Kenworthy, Leigh; Roy S. Howard, Grappenhall, both of England

[73] Assignee: Nuclear Power Company Limited, London, England

[21] Appl. No.: 874,421

[22] Filed: Feb. 2, 1978

[51] Int. Cl.² .................................................. G21C 11/00
[52] U.S. Cl. ................................... 176/40; 176/38; 176/87
[58] Field of Search ............... 176/40, 38, 50, 61, 176/65, 64, 87, DIG. 2

[56] References Cited
U.S. PATENT DOCUMENTS

| | | | |
|---|---|---|---|
| 4,046,629 | 9/1977 | Darston et al. | 176/65 |
| 4,055,465 | 10/1977 | Lemercier | 176/65 |

*Primary Examiner*—Harvey E. Behrend
*Attorney, Agent, or Firm*—Larson, Taylor and Hinds

[57] ABSTRACT

In a liquid metal cooled fast breeder nuclear reactor of the pool kind the inner wall surface of the core tank has continuous fins inclined upwardly to form troughs through which cool liquid metal drawn from the outer region of the pool of coolant can cascade and thereby jacket the wall surface with relatively cool coolant.

4 Claims, 2 Drawing Figures

LIQUID METAL COOLED FAST BREEDER NUCLEAR REACTORS

BACKGROUND OF THE INVENTION

This invention relates to liquid metal cooled fast breeder nuclear reactor constructions.

In one known construction of liquid metal cooled fast breeder nuclear reactor the reactor fuel assembly is submerged in a pool of liquid metal coolant in a primary vessel which is housed in a concrete vault. The fuel assembly is carried by a strongback and is surrounded by an inner tank defining an inner or hot region of the pool and an outer or cool region of the pool. There are coolant pumps in the outer region which circulate coolant upwardly through the fuel assembly by way of the strongback thence to heat exchangers in the hot region which discharge to the cool region. During operation of the reactor the temperature of the hot region is approximately 540° C. and that of the cool region approximately 370° C. and there is a differential in the coolant levels in the regions due to the differential pressure over the inlet and outlet ports of the pump. In order to reduce the complex stresses in the wall of the inner tank due to the temperature differential across it and to reduce temperature degradation of the hot region coolant, the inner surface of the wall is clad with thermal insulation. Several forms of thermal insulation have been used or proposed, but for various reasons have proved unsatisfactory. One form of insulation comprises spaced sheets of stainless steel defining a radial series of compartments in which liquid coolant will stagnate, each sheet comprising a pair of membranes secured together face-to-face and welded together in quilted pattern manner but there is difficulty in the pre-operation water testing of this material and, in use, superficial thermal expansion sets up complex stresses in the material. Another form of insulation comprises a layer of stainless steel blocks attached to the wall surface and covered with a stainless steel membrane but the attachments required for the blocks and membrane are so numerous that the insulation becomes very expensive.

In a co-pending United States patent application entitled Liquid Metal Cooled Fast Breeder Nuclear Reactor Construction by John Graham Durston and John Richard Hind filed on the same day as the present application there is disclosed a liquid metal cooled fast breeder nuclear reactor construction comprising a nuclear reactor fuel assembly submerged in a pool of coolant within a primary vessel and having an inner tank surrounding the fuel assembly and defining inner and outer regions of the pool, a coolant pump in the outer region for circulating coolant through the fuel assembly and through a heat exchanger disposed in the inner region, wherein the inner tank has a vertically extending series of spaced fins attached to its inner surface, the fins extending continuously around the inner surface and being inclined upwardly to form, in cooperation with the inner wall surface of the inner tank, a series of coolant retaining troughs, the free ends of the fins being disposed above the roots of the adjacent upper fins.

In operation of the nuclear reactor the coolant contained by the troughs remains substantially static the denser cooler liquid metal falling in the troughs to the inner wall surface of the inner tank thereby cladding substantially the whole of the submerged surface with cooler coolant.

SUMMARY OF THE INVENTION

According to the present invention in a liquid metal cooled fast breeder nuclear reactor construction of the kind comprising a nuclear reactor fuel assembly submerged in a pool of coolant within a primary vessel and having an inner tank surrounding the fuel assembly and defining inner and outer regions of the pool, a coolant pump in the outer region for circulating coolant through the fuel assembly and through a heat exchanger disposed in the inner region, the inner tank having a vertically extending series of spaced fins attached to its inner surface, the fins extending continuously around the inner surface and being inclined upwardly to form, in co-operation with the inner wall surface of the inner tank, a series of coolant retaining troughs, the free ends of the fins being disposed above the roots of the adjacent upper fins, the troughs have drainage holes and there is a pump for drawing coolant from the outer region of the pool and delivering it into the uppermost trough so that the coolant can cascade, in contact with the inner wall surface, through the troughs. A construction according to the present invention has the advantage that the cold cladding for the inner wall of the inner tank extends to the upper reaches of the inner tank where under operating conditions of the reactor the inner wall surface is not in contact with pool coolant but is exposed to reflected heat of the inner region of the pool. A thermally insulating barrier comprising a plurality of spaced layers of sheet material defining a radial series of chambers for containing relatively static coolant may also be interposed between a cover plate and the finned wall surface further to enhance the isolation of the relatively cool, wall cladding coolant from the hot coolant of the inner region.

DESCRIPTION OF THE DRAWINGS

A construction of liquid metal cooled faster breeder nuclear reactor embodying the invention is described, by way of example, with reference to the accompanying drawings wherein.

DESCRIPTION OF THE PREFERRED EMBODIMENT

Figure 1:
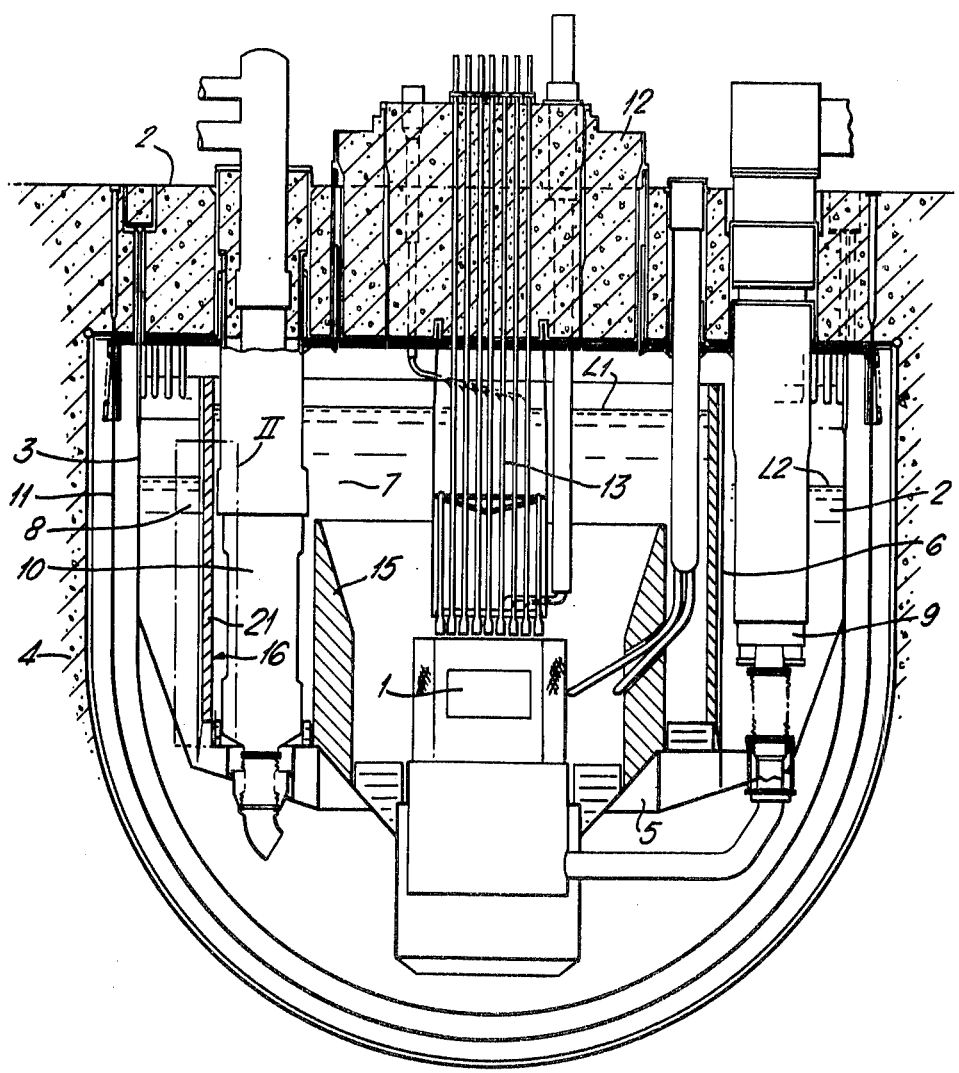
FIG. 1 is a diagrammatic sectional view of the construction.

In the construction shown in FIG. 1 the reactor fuel assembly is submerged in a pool of liquid sodium coolant 2 in a primary tank 3 which is housed in a concrete vault 4. The fuel assembly is carried by a strongback 5 and is surrounded by an inner tank 6 which defines the inner and outer regions 7, 8 of the pool. These are eight coolant pumps 9 (only one being shown in FIG. 1) in the outer region 8 for circulating coolant through the fuel assembly by way of the strongback 5 and thence to eight heat exchangers 10 (again only one being shown in FIG. 1) disposed in the inner region 7. The heat exchangers finally discharge the coolant into the outer region. The primary tank 3, a leak jacket 11 for the primary tank, the strongback 5, heat exchangers 10 and coolant pumps 9 are all suspended from the roof of the vault and the roof includes a double rotating shield 12 from which control rods 13 extend to the top of the fuel assembly. A neutron shield 15 surrounds the fuel assembly within the inner tank 6. A secondary liquid sodium coolant flowing through the heat exchangers conveys the heat energy derived from the fuel assembly to steam generating plant not shown in the drawings.

In operation of the reactor the coolant in the inner region of the pool is at temperature approximately 540° C. and that in the outer region is at temperature approximately 370° C. The pressure differential across the inlet and outlet ports of the pumps 9 causes a differential in the levels of the coolant in the regions the levels being designated L1 and L2.

Figure 2:
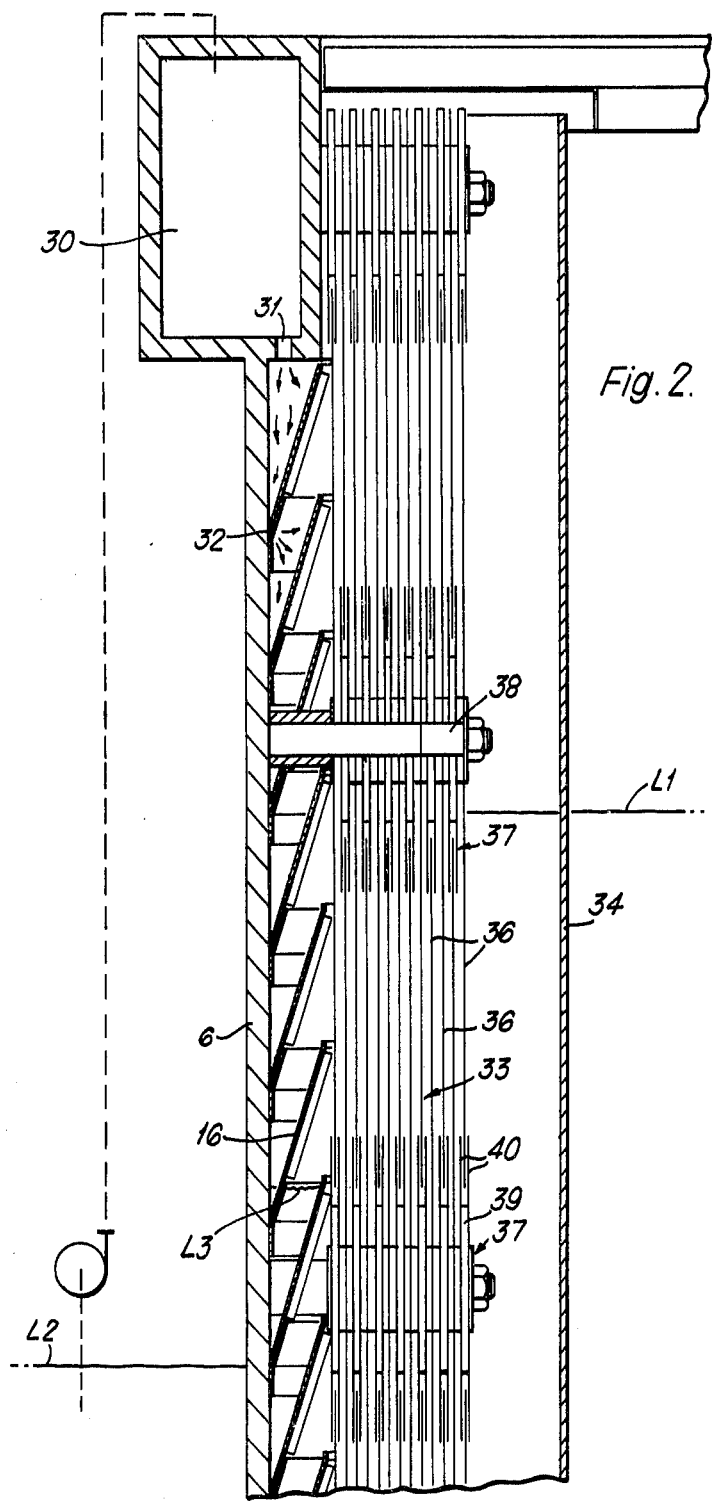
FIG. 2 is a fragmentary view in section of a part of the inner tank, and designated II in FIG. 1.

FIG. 2 shows a fragment of the inner tank 6 having a vertical series of spaced fins 16 attached to its inner surface. The fins extend continuously around the inner surface and are inclined upwardly from the wall surface at an angle of approximately 30° to form, in co-operation with the inner wall surface, a series of coolant retaining troughs. The free ends of the fins extend above the roots of the adjacent upper fins and there is a header 30 about the rim of the inner tank into which liquid sodium can be pumped from the outer region of the pool of coolant by means of an electro magnetic pump 41 shown diagrammatically in the drawings but which is of conventional kind for example, as disclosed in U.S. Pat. No. 3,885,890. The header 30 has a series of outlets 31 in its lower face through which sodium can drain into the upper trough. The troughs each have a series of drain holes 32 so that sodium draining from the header 30 can pass successively from the upper trough to the lower troughs. Thermal insulation 33 is attached to the inner wall adjacent to the fins and the insulation is screened by a cover plate 34 which has base apertures 35 to allow free flow of liquid metal. The thermal insulation 33 comprises a plurality of spaced layers of stainless steel sheet defining a radial series of chambers for containing relatively static coolant each layer lying substantially parallel to the wall surface and comprising rectilinear panels 36 secured to the wall surface in spaced array in vertical and horizontal rows. The spaces between adjacent panels are closed by members 37 of cruciform shape the arms of the members being arranged to overlap opposed faces of adjacent panels 36. The panels 36 and cruciform members 37 are secured to the internal wall surface of the inner tank by central retaining studs 38 and the rows of panels in adjacent layers are displaced, relatively, by one half pitch of the rows in the horizontal and vertical directions. The closure members comprise a cruciform spacer 39 intermediate a pair of cruciform closure strips 40 the inner (relative to the clad side of the framework) cruciform strip of each member being welded to the spacer whilst the outer strip is free for assembly after placing the complementing panel. The sealing strips of each closure member are disposed to overlap opposed faces of a panel and each arm of the cruciform member co-operates with an arm of a neighboring cruciform member to extend along and overlap adjacent sides of adjacent panels. The combination of cruciform strips, spacer and panel form a labyrinth barrier serving to restrict flow of coolant through each layer of panels.

In operation of the nuclear reactor the relatively cold sodium cascading through the troughs clads the wall of the inner tank thereby reducing the temperature differential across it. The arrangement has particular advantage in that the cold cladding extends to the upper reaches of the inner tank where under operating conditions of the reactor the inner wall surface is not in contact with sodium but is exposed to reflected heat of the inner region of the pool of coolant. This advantage is of greater significance when the reactor is operating under low power and the surface level of the inner pool of coolant is relatively low as indicated by the designation L3 in FIG. 1. Although the fins disposed below the surface level of the coolant in the inner pool are submerged in relatively hot coolant the relatively cool coolant supplied by the electro-magnetic pump, being of greater density, will continue to drain to the lower trough thence can flow through the apertures in the cover plate into the main body of the inner pool. The thermal insulation forms a barrier tending to isolate cooler sodium in the inner space between the insulation and the wall surface of the inner tank from the hotter sodium of the inner pool. Although the insulation greatly restricts flow of coolant through it it is not imperforate and, because of the greater density of the coolant outside the insulation barrier, flow through the insulation is radially inwardly into the hotter sodium.

We claim:

1. A liquid metal cooled fast breeder nuclear reactor construction comprising:
   a primary vessel containing a pool of liquid metal,
   a fuel assembly submerged in the pool of liquid metal,
   an inner tank surrounding the fuel assembly and defining inner and outer regions of the pool,
   a heat exchanger disposed in the inner region,
   a first coolant pump disposed in the outer region for circulating coolant through the fuel assembly and heat exchanger,
   the inner tank having a vertically extending series of spaced fins attached to its inner surface, the fins extending continuously around the inner surface and being inclined upwardly to form, in co-operation with the inner wall surface of the inner tank, a series of coolant retaining troughs, the troughs having drainage holes and the free ends of the fins being disposed above the roots of the adjacent upper fins, and
   a second pump disposed outside the inner tank and arranged for drawing coolant from the outer region of the pool and delivering it into the uppermost trough so that the coolant can cascade, in contact with the inner wall surface, through the troughs.

2. A liquid metal cooled fast breeder nuclear reactor construction according to claim 1 wherein there is a header extending about the rim of the inner tank, the header having an inlet port for coolant delivered by the second coolant pump and a series of outlets through which coolant can flow into the upper trough.

3. A liquid metal cooled fast breeder nuclear reactor construction according to claim 2 wherein there is a continuous thermally insulating barrier spaced from the finned wall surface, the barrier comprising a plurality of spaced layers of sheet material defining a radial series of chambers for containing relatively static coolant.

4. A liquid metal cooled fast breeder nuclear reactor construction according to claim 3 wherein there is a cover plate for the thermally insulating barrier disposed radially inwardly thereof.

* * * * *